United States Patent
Kostelnik et al.

(10) Patent No.: US 8,394,873 B2
(45) Date of Patent: *Mar. 12, 2013

(54) POLYSILOXANE MODIFIED TITANIUM DIOXIDE

(75) Inventors: Robert J. Kostelnik, Ellicott City, MD (US); Christopher J. Drury, Ulceby (GB); Charles A. Wheddon, Tetney (GB)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/310,015

(22) Filed: Dec. 2, 2011

(65) Prior Publication Data

US 2012/0077933 A1 Mar. 29, 2012

Related U.S. Application Data

(63) Continuation of application No. 11/643,294, filed on Dec. 21, 2006, now Pat. No. 8,088,853.

(51) Int. Cl.
*C08K 9/06* (2006.01)

(52) U.S. Cl. ........ 523/212; 524/265; 524/267; 524/269; 524/413

(58) Field of Classification Search .................. 523/212; 524/265, 267, 269, 413

See application file for complete search history.

(56) References Cited

U.S. PATENT DOCUMENTS

| | | | |
|---|---|---|---|
| 3,767,455 A | 10/1973 | Claridge et al. | |
| 4,052,223 A | 10/1977 | Howard | |
| 4,061,503 A | 12/1977 | Berger et al. | |
| 4,810,305 A | 3/1989 | Braun et al. | |
| 5,391,600 A | 2/1995 | Umeda et al. | |
| 2,717,246 A | 9/1995 | Kienle et al. | |
| 5,562,764 A | 10/1996 | Gonzalez | |
| 5,607,994 A | 3/1997 | Tooley et al. | |
| 5,631,310 A | 5/1997 | Tooley et al. | |
| 5,837,757 A | 11/1998 | Nodera et al. | |
| 5,889,090 A | 3/1999 | Tooley et al. | |
| 5,932,757 A | 8/1999 | Standke et al. | |
| 5,959,004 A | 9/1999 | Tooley et al. | |
| 6,319,980 B1 | 11/2001 | Ishikawa et al. | |
| 6,455,158 B1 | 9/2002 | Mei et al. | |
| 6,620,234 B1 | 9/2003 | Kostelnik et al. | |
| 6,646,037 B1 | 11/2003 | El-Shoubary et al. | |
| 6,660,822 B2 | 12/2003 | Lyu et al. | |
| 6,695,906 B2 | 2/2004 | Hiew et al. | |
| 6,765,041 B1 | 7/2004 | El-Shoubary et al. | |
| 6,852,306 B2 | 2/2005 | Subramanian et al. | |
| 6,878,769 B2 | 4/2005 | Sakamoto et al. | |
| 7,641,972 B2 | 1/2010 | Nolte et al. | |
| 7,897,256 B2 | 3/2011 | Kerner et al. | |
| 2002/0043464 A1 | 4/2002 | Miyatake et al. | |
| 2004/0121903 A1 | 6/2004 | Ito et al. | |
| 2007/0040304 A1 | 2/2007 | Bell et al. | |

FOREIGN PATENT DOCUMENTS

| | | |
|---|---|---|
| CA | 1824710 A | 6/2012 |
| DE | 19724638 | 1/1998 |
| EP | 1236773 A2 | 9/2002 |
| EP | 1323782 A2 | 7/2003 |
| EP | 1690902 B | 2/2006 |
| EP | 1690902 A2 | 8/2006 |

OTHER PUBLICATIONS

AU 2007338615, Examiner's first report on patent application, 2010.
Skinner, Harry, Current Diagnosis & Treatment in Orthopedics, Jun. 20, 2003, 3$^{rd}$ Edition, p. 33; (Molecular weight and Tensile strength).
Canadian Patent Application No. 2,672,623; Office Action dated Dec. 30, 2010.
Titanium Oxide MSDA—TSI, Inc. Feb. 16, 2006.
International Search Report and Written Opinion for PCT/US2007/79533; Mar. 27, 2008; 10 pages.
Chinese Application No. 200780047028.9; Second Office Action dated Jul. 19, 2012; 4 pages.
European Application No. 07853638.0; EPO Communication Third Party Observation dated Aug. 5, 2012; 7 pages.
Supplementary European Search Report; European Publication No. EP2094484; Sep. 21, 2012; 5 pages.

*Primary Examiner* — Shane Fang
(74) *Attorney, Agent, or Firm* — Dunlap Codding, P.C.

(57) ABSTRACT

A particle of titanium dioxide treated with a polysiloxane is disclosed. One or more silicon atoms of the polysiloxane is substituted with an alkylene group terminating with a silyl group containing three substituents selected from the group consisting of hydroxy, halo, alkoxy, acetoxy, and mixtures thereof. These treated particles are blended with organic polymers to form a polyethylene polymer matrix having dispersed therein at least 55 wt % polysiloxane modified titanium dioxide particles.

16 Claims, No Drawings

POLYSILOXANE MODIFIED TITANIUM DIOXIDE

CROSS REFERENCE TO RELATED APPLICATIONS

This application is a continuation of U.S. Ser. No. 11/643,294 filed Dec. 21, 2006, now U.S. Pat. No. 8,088,853 the entire contents of which are hereby expressly incorporated by reference herein.

STATEMENT REGARDING FEDERALLY SPONSORED RESEARCH OR DEVELOPMENT

Not applicable.

BACKGROUND

1. Field of Invention

The inventive concepts disclosed and claimed herein relate to a particle obtained by treating titanium dioxide with a polysiloxane. Blends of these particles with organic polymers are disclosed.

2. Background of the Invention

Titanium dioxide has found widespread use. Typically it is used in another matrix to impart certain properties. For example, it is widely used as a white pigment for paints and polymers. Other applications use small particle titanium dioxide which has different optical properties. For these and other applications, it is critical to have good dispersion of the titanium dioxide. Dispersing agents are often added to the titanium dioxide. Selection of the dispersing agent is often a compromise between effectiveness, cost, compatibility with other additives in the matrix, and performance properties in the matrix. For this reason, much work has been done to improve the dispersion of titanium dioxide in various matrices.

A variety of treatments has been studied. U.S. Pat. No. 6,646,037 treats the titanium dioxide with alkyl sulfonic acid salts and U.S. Pat. No. 6,765,041 discloses treatment with alkyl phosphate esters. Organosilicon compounds have been used. For instance, U.S. Pat. No. 4,061,503 discloses the treatment of particulate titanium dioxide with a polyether-substituted silicon compound for improving the dispersibility of titanium dioxide in pigmented and/or filled paints and plastics, and reinforced plastic composite compositions.

U.S. Pat. No. 4,810,305 discloses an organopolysiloxane with improved dispersibility. The polysiloxane is a hydrosiloxane such as polymethylhydrosiloxane. U.S. Pat. Nos. 5,607,994, 5,631,310, 5,889,090, and 5,959,004 disclose the use of a mixture of a hydrolyzable silane such as butyltrimethoxysilane and a polysiloxane such as polydimethylsiloxane. U.S. Pat. No. 5,932,757 describes a mixture of oligomers of alkylalkoxysilanes.

U.S. Pat. No. 6,620,234 discloses mixing a reactive chlorosilane such as hexyl trichlorosilane with titanium dioxide in an aqueous media to form coated titanium dioxide. The byproduct hydrochloric acid is neutralized and removed as a salt.

While there have been much research regarding the coating of titanium dioxide with silanes and siloxanes, further improvements are needed. To date, treatment techniques are often a compromise between processability and final properties. Many silicon-containing compounds are not sufficiently reactive with titanium dioxide to provide effective coatings. Other silicon-containing compounds are either volatile or produce volatile side products. In an effort to improve reactivity, functional groups such as alkoxy groups have been used, but the alcohol generated as a byproduct can cause environmental issues during pigment production. Use of halosilanes in aqueous media can solve this problem, but it is a more complicated process and adds to the cost. Despite the significant research done in this area, there is a need for further improvements.

SUMMARY OF THE INVENTION

The inventive concepts disclosed and claimed herein relate to a particle and blends of these particles with organic polymers. The particle is obtained by treating titanium dioxide with a polysiloxane. One or more silicon atoms of the polysiloxane are substituted with an alkylene group that is terminated with a silyl group containing three substituents selected from the group consisting of hydroxy, halo, alkoxy, acetoxy, and mixtures thereof.

DETAILED DESCRIPTION OF THE INVENTION

The inventive concepts disclosed and claimed herein relate to a particle and blends of these particles with organic polymers. The particle is obtained by treating titanium dioxide with a polysiloxane. Any form of titanium dioxide is suitable for the particle of the invention. Preferably, the titanium dioxide is in the rutile or anatase form. The titanium dioxide can be prepared by any known process, such as the sulfate process or the chloride process.

The titanium dioxide useful in the invention has a typical particle size in the range of 0.001 to 20 µm. For use in typical pigmentary applications, the titanium dioxide preferably has a particle size in the range of from 0.1 to 0.5 µm, more preferably from 0.2 to 0.35 µm. For use in photocatalytic applications, the titanium dioxide preferably has a particle size in the range of from 1.001 to 0.1 µm.

The titanium dioxide may be untreated titanium dioxide obtained directly from a production process such as the chloride or sulfate processes. Alternatively, the titanium dioxide may be treated with at least one coating material prior or subsequent to treatment with the polysiloxane of the present invention. Suitable coating materials include inorganic oxides, such as aluminum oxide, silicon dioxide, zirconium oxide, inorganic phosphates, acid-soluble titanium dioxide, and the like. Suitable organic coating materials include polyalcohols such as trimethylolpropane and alkanolamines, such as triethanolamine. Preferably, the titanium dioxide is coated with alumina. The amount of alumina is preferably 0.01-0.8% by weight in terms of $Al_2O_3$ relative to $TiO_2$. Processes to deposit metal oxides into a titanium dioxide are well known to those skilled in the art. Preferably, the metal oxides are added by wet treatment or by gas-phase deposition. Suitable wet treatment techniques are taught in U.S. Pat. Nos. 3,767,455, 4,052,223, and 6,695,906, the teachings of which are incorporated herein by reference. Suitable gas-phase deposition techniques are taught in U.S. Pat. Nos. 5,562,764 and 6,852,306, the teachings of which are incorporated herein by reference.

The titanium dioxide is treated with a polysiloxane. One or more silicon atoms of the polysiloxane are substituted with an alkylene group that is terminated with a silyl group containing three substituents selected form the group consisting of hydroxy, halo, alkoxy, acetoxy, and mixtures thereof.

Preferably, the polysiloxane has the general formula:

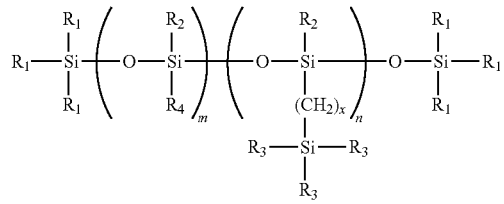

wherein each of $R_1$ and $R_2$ is independently selected from the group consisting of $C_1$ to $C_{14}$ hydrocarbyl; each $R_3$ is selected from the group consisting of hydroxy, halo, alkoxy, and acetoxy; $R_4$ is selected from the group consisting of $C_1$ to $C_{22}$ hydrocarbyl; x is an integer from 1 to 22; m is an integer from 0 to 500; and n is an integer from 1 to 500. Preferably, $R_3$ is selected from the group consisting of hydroxy and alkoxy. Preferably, $R_4$ is $C_6$ to $C_{10}$ hydrocarbyl. Preferably, $R_1$ is methyl. Preferably, the sum of m+n is greater than 12, more preferably, greater than 20. Preferably, m is greater than n and more preferably greater than 3n.

The polysiloxane can be made by any method. One convenient method is to combine the cyclic precursors in an acid or base catalyzed reaction. For example:

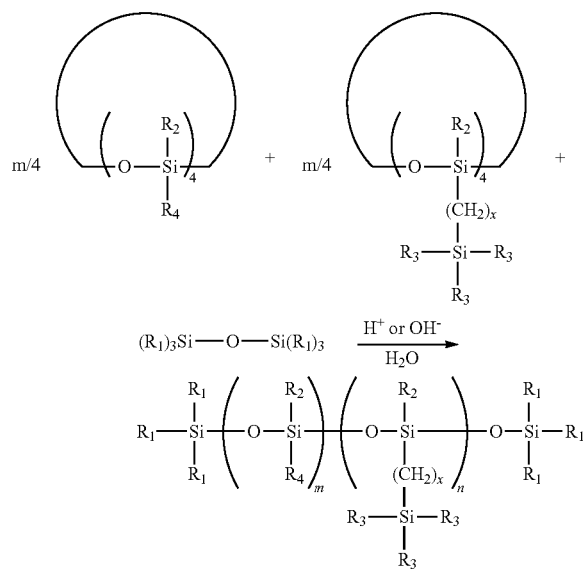

The cyclic monomer containing the silane can be prepared by any method. One convenient method is from a hydrosiloxane and a silane as shown below:

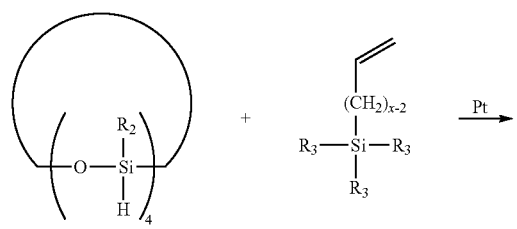

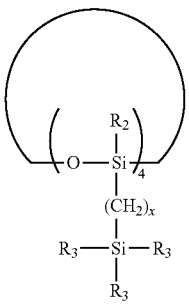

This method is described in U.S. Pat. No. 6,660,822, which is incorporated herein by reference.

Titanium dioxide is treated with the polysiloxane. The polysiloxane may be added neat, as a solution, or as an emulsion. Preferably, the polysiloxane is added neat or as an aqueous emulsion. The methods for adding the polysiloxane may be similar to methods for adding other surface treatments that are flexibly and easily incorporated into titanium dioxide production processes. Thus, there are many places during production of titanium dioxide in which the polysiloxane may be added and the points of additions described herein are not meant to be exhaustive. The optimal point during which to add the polysiloxane will in part depend on the process in which it is to be incorporate In the simplest of methods, the polysiloxane may be added by spraying or pouring into a system in which the titanium dioxide is already present. To maximize the uniformity of the distribution of the polysiloxane, preferably, a mixing device is used to mix or to stir the polysiloxane and the titanium dioxide. Devices such as a V-shell blender equipped with an intensifier bar for application of a liquid to a powder or other suitable mixing devices now known or that come to be known to those skilled in the art may be used.

One preferred mixing device is a micronizer. The polysiloxane may be metered into a micronizer or jet pulverizer along with the titanium dioxide powder to be ground. Air or steam micronization techniques may be used at temperatures from room temperature up to 250° C. or higher.

In a conventional production process, the polysiloxane may, by way of further example, be added to the spray drier feed or repulped filter cake, to a high intensity milling device or to a micronizer feed prior to or concurrent with micronization. In other titanium dioxide processes, it may be desirable to add the polysiloxane to a fluidized, washed filter cake with agitation in order to assure uniform mixing of the polysiloxane among the titanium dioxide particles. Further, in some embodiments, it is desirable to add the polysiloxane after any filtration and washing stages, but prior to any drying stage.

If the polysiloxane is added to a dry titanium dioxide such as a spray drier product or micronizer feed, particular care should be taken to ensure uniform mixing of the polysiloxane with the titanium dioxide powder. This may, for example, be accomplished by using a V-shell blender equipped with an intensifier bar or by using other suitable mixing devices. After the polysiloxane has been combined with the titanium dioxide, the treated titanium dioxide may be fluid energy milled using steam or air to produce a treated, finished titanium dioxide.

Preferably, the weight ration of polysiloxane to titanium dioxide is form 0.0001:1 to 0.5:1 and more preferably from 0.001:1 to 0.02:1.

For use in pigmentary applications, preferably the particle of titanium dioxide treated with the polysiloxane has a mean particle diameter of from 0.2 to 0.35 microns. For certain other applications, preferably the particle has a mean particle diameter of less than 0.2 microns.

The particle of titanium dioxide treated with the polysiloxane can be blended with an organic polymer. Preferably, the treated titanium dioxide is dry blended with the organic polymer and then mixed in the melt. This can be done, for example, by using a Banbury mixer or a twin screw extruder. The amount of treated titanium dioxide used will vary dependent upon the final application. One convenient technique is to first prepare a concentrate of the treated titanium dioxide with the organic polymer and then mix the concentrate with more organic polymer to achieve the desired weight ratio.

Any organic polymer may be used. Preferably, the organic polymer is selected from the group consisting of polyethylenes, polypropylenes, polystyrenes, polycarbonates, polyvinylchlorides, and copolymers of ethylene and $C_{4-12}$ α-olefins. More preferably, the organic polymer is polyethylene. Dependent upon the application, the composition of treated titanium dioxide and organic polymer can contain other additives, fillers, and pigments. Zinc sulfide, barium sulfate, calcium carbonate, and combinations thereof are preferred pigments for use in the composition.

The following examples merely illustrate the invention. Those skilled in the art will recognize many variations that are within the spirit of the invention and scope of the claims.

Example 1

Titanium Dioxide Modified with Siloxane 1

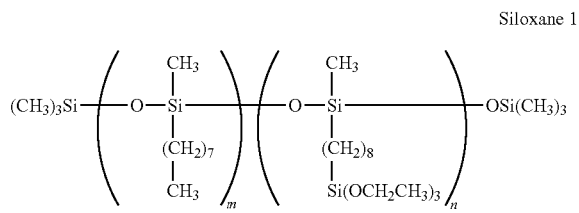

Siloxane 1

Sodium aluminate (30.8 mL of a 343 g $Al_2O_3$/L aqueous solution) is added to an aqueous slurry of 5,000 grams of fine particle chloride process rutile titanium dioxide (350 g $TiO_2$/L) with mixing at 70° C. The slurry pH is adjusted to 7.0 using a concentrated hydrochloric acid (aqueous) solution, and the slurry is allowed to age for 30 minutes with stirring. The aged slurry is filtered and washed twice with 5000 mL aliquots of 80° C. deionized water, and then dried overnight at 110° C. in an oven. The dried filter cake (0.2% $Al_2O_3$ on $TiO_2$) is forced through an 8-mesh screen in preparation for treatment with organics.

A portion of the dry, 8 mesh, alumina-coated $TiO_2$ (1000 g) is spread to a 1 cm thickness on polyethylene film and Siloxane 1 (12.2 g; molecular weight=5,400 g/mol; molar ratio of m/n=19:1) is added dropwise in a circular motion to give a 1.2% loading level. The pigment is mixed with a large spatula and transferred to a one gallon wide-mouth Nalgene bottle. The bottle containing pigment is rolled for 10 minutes on a roller mill. The rolled pigment is steam micronized to produce the finished pigment.

The finished pigment (125 g) is dry blended with low density polyethylene (125 g of LDPE 722 available from Dow Chemical Company) and added to a 75° C. preheated chamber of a Haake 3000 Rheomix mixer with rotors running a 50 rpm. One minute after addition of the blend, the chamber temperature is raised to 105° C. Frictional heat generated by the mixing process is allowed to drive the rate of incorporation of the $TiO_2$ into the LDPE until a steady state mixture is achieved. The concentrate is removed from the mixing chamber and placed into a Cumberland Crusher to obtain finely granulated 50% concentrate samples. The granulated concentrates are conditioned for 48 hours at 23° C. and 50% relative humidity. The concentrate is then let down into LDPE to achieve a 20% loading of $TiO_2$ in the final film.

Lacing evaluations are run on a 25 mm extruder equipped with a cast film slot die. A temperature profile of 330° C. die, 270° C. clamp ring, 215° C. zone 3, 175° C. zone 2, and 150° C. zone 1 is used. The screw speed is set at about 90 rpm. A 25.4 cm polished chrome chill roll, set in conjunction with the extruder is used to maintain a 75 micron film thickness, and to cool and transport the films. The chill roll distance from the die lips is about 22 mm and the temperature is about 27° C.

After the $TiO_2$/LDPE mix is placed in the hopper, the material is allowed to purge until the appearance of a white tint in the film is first noted. To ensure the concentration of $TiO_2$ in the film has stabilized, a time interval of two minutes is allowed before lacing observations are recorded and a film sample obtained. Lacing performance is determined by counting the relative size and number of holes generated in a film sample laid out on a dark surface. A 1.0-3.0 rating system is used. A rating of 1 is given to films with no lacing, 2 is given to films showing the onset of lacing and 3 is given to films with extreme lacing. Increments of 0.1 are used to give an indication of the relative performance between the samples. The film had a rating of 1.0 indicating low volatility and excellent temperature stability.

Using a small-scale laboratory extrusion apparatus, a measure of particulate inorganic solid dispersion into organic polymers is obtained by measuring the relative amount of particulate inorganic solid trapped onto screens of extruder screen packs. Tests are made using 75% $TiO_2$ concentrates in low density polyethylene prepared using a Haake 3000 Rheomix mixer. The mixer is controlled and monitored with a Haake 9000 Rheocord Torque Rheometer.

A 75% concentrate is made by dry blending the finished pigment (337.7 g) and LDPE (112.6 grams NA209 available from Equistar Chemicals) and adding the blend to a 75° C. mixing chamber with rotors operating at 50 rpm. The mixer temperature is programmed to increase to 120° C. one minute after the dry blend is introduced to the mixing chamber. After a steady state mixture is achieved, the compound is mixed for an additional 3 minutes. The compound is removed from the chamber and granulated using a Cumberland crusher.

Dispersion tests are conducted using a Killion single screw extruder, model KL-100 equipped with a 20:1 length to diameter screw. The extruder is preheated at 165, 175, 200, 195° C. from zone 1 to the die, respectively, and operated at 70 rpm. A purge of 1000 g of LDPE is run through the system, and a new screen pack is installed. The screen pack consisted of 40/500/200/100 mesh screens from the die towards the extruder throat. After temperature stabilization, the granulated 75% concentrate (133.3 g) is fed into the extruder. This is followed with 1500 g of LDPE purge as the feed hopper empties. After the LDPE purge is extruded, the screens are removed, separated and tested using a relative count technique from the measurements from an X-ray fluorescence spectrometer. The number of $TiO_2$ counts per second is obtained for the 100, 200 and 500 mesh screens in the pack and totaled to obtain the dispersion result. Lower $TiO_2$ counts per second are desired.

A count result of less than 5000 is considered to represent excellent dispersion. The concentrate had 670 counts per second indicating excellent dispersion.

Examples 2-4

Titanium Dioxide Modified with Siloxane 1

In similar fashion as in Example 1, blends are prepared and evaluated from titanium dioxide modified with soloxane 1 with different ratios of m and n, with different molecular weights of the siloxane, and with different loading levels of siloxane. The conditions and results are shown in Table 1. All show excellent dispersion, low volatility, and excellent temperature stability.

Examples 5-7

Titanium Dioxide Modified with Siloxane 2

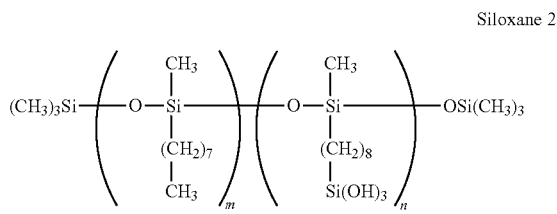

Siloxane 2

In similar fashion as in Example 1, blends are prepared and evaluated from titanium dioxide modified with siloxane 2, which is added to the titanium dioxide as an aqueous emulsion (50% solids). The conditions and results are shown in Table 1. All display excellent dispersion, low volatility, and excellent temperature stability.

Examples 8-13

Sulfate Process Titanium Dioxide Modified with Siloxane

In similar fashion as in Example 1, blends are prepared and evaluated from titanium dioxide modified with siloxane. Blends are prepared using sulfate process rutile titanium dioxide with 0.4% $Al_2O_3$ on $TiO_2$. The conditions and results are shown in Table 1. All show excellent dispersion, low volatility and excellent temperature stability demonstrating that the benefit of the siloxanes is general and useful for the modification of titanium dioxide prepared by the sulfate process.

Comparative Example 14

Titanium Dioxide Modified with Triethanolamine

In similar fashion as in Example 1, a blend is prepared and evaluated from chloride process rutile titanium dioxide modified with triethanolamine, a known modifier, rather than siloxane. The conditions and results are shown in Table 1. The dispersion is much worse than found with the siloxane modifiers.

TABLE 1

| | | Reaction Zone A Conditions | | | | |
|---|---|---|---|---|---|---|
| Example | Modifier | Loading | Mol. Wt. | m/n | Dispersion | Lacing |
| 1 | Siloxane 1 | 1.2 | 5,400 | 19 | 670 | 1.0 |
| 2 | Siloxane 1 | 0.9 | 5,600 | 9 | 490 | 1.0 |
| 3 | Siloxane 1 | 0.9 | 5,800 | 4 | 430 | 1.0 |
| 4 | Siloxane 1 | 0.9 | 26,000 | 19 | 2,660 | — |
| 5 | Siloxane 2 | 0.75 | — | 30 | 650 | 1.3 |
| 6 | Siloxane 2 | 0.9 | — | 30 | 460 | 1.3 |
| 7 | Siloxane 2 | 0.9 | — | 9 | 480 | 1.4 |
| 8 | Siloxane 1 | 0.9 | 5,400 | 19 | 690 | 1.1 |
| 9 | Siloxane 1 | 1.2 | 5,600 | 9 | 1,360 | 1.1 |
| 10 | Siloxane 1 | 0.9 | 5,800 | 4 | 1,230 | — |
| 11 | Siloxane 2 | 1.1 | — | 30 | 900 | 1.2 |
| 12 | Siloxane 2 | 1.5 | — | 30 | 420 | 1.4 |
| 13 | Siloxane 2 | 1.1 | — | 9 | 490 | 1.2 |
| C14 | Triethanolamine | 0.6 | — | — | 13,700 | 1.4 |

From the above examples and descriptions, it is clear that the present inventive process(es), methodology(ies), apparatus(es) and composition(s) are well adapted to carry out the objects and to attain the advantages mentioned herein, as well as those inherent in the presently provided disclosure. While presently preferred embodiments of the invention have been described for purposes of this disclosure, it will be understood that numerous changes may be made which will readily suggest themselves to those skilled in the art and which are accomplished within the spirit of the presently claimed and disclosed inventive concept(s) described herein.

What is claimed is:

1. A polyethylene polymer matrix having dispersed therein at least 55 wt % titanium dioxide particles modified with an organic silicon-containing compound consisting of a polysiloxane having the general formula:

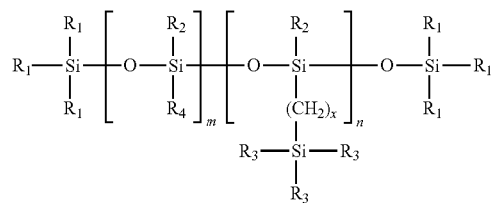

wherein each of R1 and R2 is independently selected from the group consisting of C1 to C14 hydrocarbyl; each R3 is selected from the group consisting of hydroxyl, halo, alkoxy, and acetoxy; R4 is selected from the group consisting of C1 to C22 hydrocarbyl; x is an integer from 1 to 22; m is an integer from 0 to 500; and n is an integer from 1 to 500.

2. The polyethylene polymer matrix of claim 1, wherein R3 is alkoxy.

3. The polyethylene polymer matrix claim 1, wherein R3 is hydroxy.

4. The polyethylene polymer matrix of claim 1, wherein R4 is C6 to C10 hydrocarbyl.

5. The polyethylene polymer matrix of claim 1, wherein the sum of m+n is greater than 12.

6. The polyethylene polymer matrix of claim 1, wherein m is greater than n.

7. The polyethylene polymer matrix of claim 1, having dispersed therein about 55 wt % to about 75 wt % polysiloxane modified titanium dioxide particles.

8. The polyethylene polymer matrix of claim 1, wherein the weight ratio of polysiloxane to titanium dioxide is from 0.0001:1 to 0.5:1.

9. The polyethylene polymer matrix of claim 1, wherein the weight ratio of polysiloxane to titanium dioxide is from 0.001:1 to 0.02:1.

10. The polyethylene polymer matrix of claim 1, wherein the titanium dioxide particles have a mean particle diameter of from 0.2 to 0.35 microns.

11. The polyethylene polymer matrix of claim 1, wherein the titanium dioxide particles have a mean particle diameter of less than 0.2 microns.

12. The polyethylene polymer matrix of claim 1, wherein the titanium dioxide is treated with at least one coating material prior or subsequent to treatment with the polysiloxane.

13. The polyethylene polymer matrix of claim 12, wherein the coating material is selected from the group consisting of aluminum oxide, silicon dioxide, zirconium oxide, inorganic phosphates, acid soluble titanium dioxide, alkanolamines, and polyalcohols.

14. A method for improving polymer lacing resistance and dispersability of titanium dioxide particles in an organic polymer, the method comprising:
mixing titanium dioxide particles with an organic silicon-containing compound consisting of a polysiloxane having the general formula:

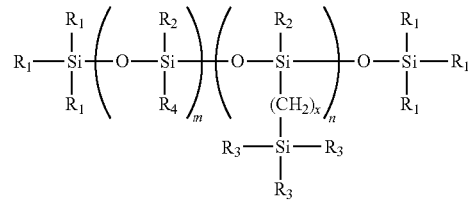

wherein each of R1 and R2 is independently selected from the group consisting of C1 to C14 hydrocarbyl; each R3 is selected from the group consisting of hydroxyl, halo, alkoxy, and acetoxy; R4 is selected from the group consisting of C1 to C22 hydrocarbyl; x is an integer from 1 to 22; m is an integer from 0 to 500; and n is an integer from 1 to 500, to produce polysiloxane treated titanium dioxide particles, and mixing said polysiloxane treated titanium dioxide particles with polyethylene to produce a concentrate containing at least 55 wt % treated titanium dioxide particles dispersed within a polyethylene matrix.

15. The method of claim 14, wherein the concentrate contains about 55 wt % to about 75 wt % treated titanium dioxide particles.

16. The method of claim 14, wherein the polysiloxane is added as an aqueous emulsion.

* * * * *

UNITED STATES PATENT AND TRADEMARK OFFICE
CERTIFICATE OF CORRECTION

PATENT NO. : 8,394,873 B2
APPLICATION NO. : 13/310015
DATED : March 12, 2013
INVENTOR(S) : Robert J. Kostelnik et al.

It is certified that error appears in the above-identified patent and that said Letters Patent is hereby corrected as shown below:

In the Specification

Column 3 line 35: In the diagram, after the "+" delete "m/4" and replace with -- n/4 --

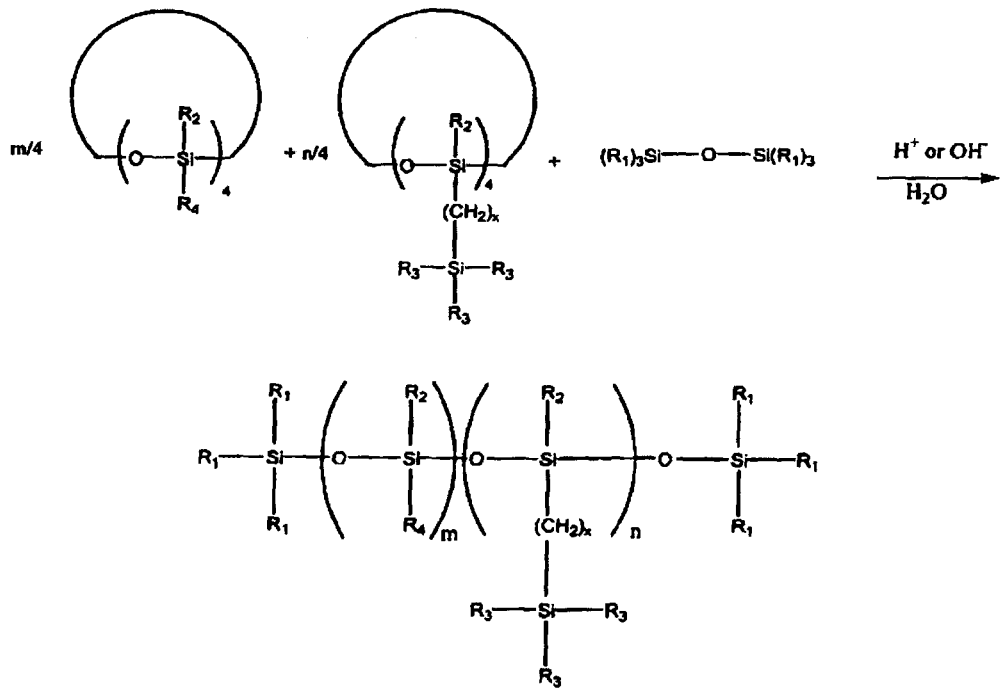

Signed and Sealed this
Thirtieth Day of July, 2013

Teresa Stanek Rea
*Acting Director of the United States Patent and Trademark Office*